(12) United States Patent
Hanscom et al.

(10) Patent No.: US 10,019,755 B1
(45) Date of Patent: Jul. 10, 2018

(54) DATA CATEGORIZATION/ITEMIZATION USING SMART MATCHING TECHNOLOGY

(75) Inventors: Kenneth William Hanscom, Newbury Park, CA (US); Michael Patrick Owen, Mountain View, CA (US); Nagananda Addagadde, Cupertino, CA (US); Neeraj Subhash Joshi, Santa Clara, CA (US); Anthony Mario Pasciucco, Jr., Oakland, CA (US); Raghunath Narasimha Battula, Sunnyvale, CA (US); Jaime Brooke Goodman, Thousand Oaks, CA (US)

(73) Assignee: Intuit Inc., Mountain View, CA (US)

( * ) Notice: Subject to any disclaimer, the term of this patent is extended or adjusted under 35 U.S.C. 154(b) by 1213 days.

(21) Appl. No.: 12/916,422

(22) Filed: Oct. 29, 2010

(51) Int. Cl.
*G06Q 40/00* (2012.01)
*G06Q 30/02* (2012.01)
*G06F 17/00* (2006.01)
*G06Q 30/00* (2012.01)

(52) U.S. Cl.
CPC .............. *G06Q 40/00* (2013.01); *G06Q 30/00* (2013.01); *G06F 17/00* (2013.01); *G06Q 30/02* (2013.01)

(58) Field of Classification Search
CPC ........ G06Q 10/00; G06Q 20/00; G06Q 30/00; G06Q 40/00; G06K 7/10722
USPC ........................................................ 705/35
See application file for complete search history.

(56) References Cited

U.S. PATENT DOCUMENTS

| | | | | |
|---|---|---|---|---|
| 7,069,240 B2* | 6/2006 | Spero | ..................... | G06Q 20/20 705/26.35 |
| 7,299,970 B1* | 11/2007 | Ching | ................ | G06K 7/10722 235/375 |
| 7,555,486 B2* | 6/2009 | Venguerov | ............. | G06Q 10/00 |
| 7,746,510 B2* | 6/2010 | Pandipati | ............... | G06Q 40/00 235/375 |
| 7,752,535 B2* | 7/2010 | Satyavolu | ......... | G06F 17/30867 705/35 |
| 8,131,600 B2* | 3/2012 | Leggett | .................. | G06Q 30/00 705/26.61 |
| 2008/0103887 A1* | 5/2008 | Oldham et al. | ........ | G06Q 30/02 705/14.71 |
| 2009/0187481 A1* | 7/2009 | Bonzi et al. | ..................... | 705/14 |
| 2009/0222364 A1* | 9/2009 | McGlynn et al. | .............. | 705/30 |

* cited by examiner

*Primary Examiner* — Clifford Madamba
(74) *Attorney, Agent, or Firm* — FBFK PC (57) ABSTRACT

A method for tracking financial transactions, including: obtaining a group of financial transactions; identifying a first financial transaction of the group of financial transactions involving a payment from a financial account held by a financial institution; allocating an amount of the first financial transaction corresponding to the payment to a budget category, wherein the first financial transaction includes a name of a merchant; accessing a website of the merchant; matching, on the website of the merchant, a list of purchased items to the first financial transaction based on the amount; extracting, after matching, the list of purchased items from the website of the merchant; identifying, after extracting the list of purchased items, a new budget category based on a purchased item of the list of purchased items; and reallocating at least a portion of the amount corresponding to the purchased item to the new budget category.

34 Claims, 7 Drawing Sheets

Allstar Personal Finance

Select a transaction to continue...

Transaction Summary  305

Date Range: January 1, 2010 – August 30, 2010   315

| | Merchant | Category | Amount | |
|---|---|---|---|---|
| Feb 15, 2010 | AMAZON.COM | Shopping $ | -30.56 | Get Details |
| Apr 21, 2010 | Pacific Gas & Electric | Shopping $ | -380.19 | Get Details |
| June 11, 2010 | City of San Jose | Shopping $ | -7.86 | Get Details |

320

310

*Select "Get Details" for an item level breakdown or to further categorize a transaction.

Menu
Transactions
 > Summary
   Detail
About Us
Contact

FIG. 3

Allstar Personal Finance http://www.allstarfinance.com

Menu
Transactions
  Summary
  > Detail
About Us
Contact

Transaction Detail

| | Merchant | Category | Amount |
|---|---|---|---|
| Feb 15, 2010 | AMAZON.COM | miscellaneous goods | -30.56 |

Please enter your credentials in order to obtain transaction detail data:

Get transaction details from Amazon.com

Enter amazon.com User name  ← 405
Enter amazon.com password  ← 410

Submit  ← 415

FIG. 4

Allstar Personal Finance

Select a transaction to continue...

| Menu | Transaction Summary | | | |
|---|---|---|---|---|
| Transactions | Date Range: | January 1, 2010 – August 30, 2010 | | |
| > Summary | | | | |
| Detail | | Merchant | Category | Amount |
| About Us | Feb 15, 2010 | AMAZON.COM | | -30.56 |
| Contact | | Description | Category | Amount |
| | | The Office – Season 5 | DVD | $25.10 |
| | | Scene It? The Simpsons | Toys 505 | $5.46 |
| | Apr 21, 2010 | Pacific Gas & Electric | Shopping $ | -380.19 |
| | June 11, 2010 | City of San Jose | Shopping $ | -7.86 |

*Select "Get Details" for an item level breakdown or to further categorize a transaction.

[Get Details] [Get Details]

DATA CATEGORIZATION/ITEMIZATION USING SMART MATCHING TECHNOLOGY

BACKGROUND

Recent trends in personal and business financial management show an increase in automation and technology integration. Financial management applications are ubiquitous in the business world and are becoming more common among individuals as the complexity of personal finance increases. Ever-changing tax rules/compliance requirements, the growing problem of financial security (i.e., identity theft), and an increase in electronic commerce (ecommerce) transactions are contributing factors.

In the last decade, ecommerce applications have grown in popularity among businesses and consumers. In addition to fast-adopters such as the online retail industry, many of the traditionally slow-to-adopt industries have made the transition to ecommerce. For example, many government agencies and public utilities now offer online payment and services. For the average consumer, the effect of this massive transition has been to greatly reduce the need for paper checks and non-electronic transaction types.

While cash and check transactions are still common, they are less frequent in today's market due to accounting and security concerns. Modern budgeting tools are able to automatically track most expenses both into and out of an individual's bank account. On the other hand, transacting in cash requires the payee to keep track of his/her transactions manually. The hassle of recording and tracking cash and check transactions is augmented by the inconvenience of carrying correct dollar amounts and/or loose change.

As a result of these trends, private and corporate interests have invested resources in the creation of standards and formats for electronic financial data exchange. Standards such as Open Financial Exchange (OFX) and Extensible Business Reporting Language (XBRL) have created a wider range of product offerings and cross-platform functionality. Accordingly, individuals and businesses have a larger assortment of financial data available to them and are utilizing financial software applications and services at an unprecedented rate.

SUMMARY

In general, in one aspect, the invention relates to a method for tracking financial transactions. The method steps include obtaining, using a financial management application (FMA) executing on a hardware processor, a group of financial transactions; identifying, using the FMA, a first financial transaction of the group of financial transactions involving a payment from a financial account held by a financial institution; allocating, using the FMA, an amount of the first financial transaction corresponding to the payment to a budget category, wherein the first financial transaction includes a name of a merchant; accessing a website of the merchant using credentials supplied by a user of the FMA; matching, on the website of the merchant, a list of purchased items to the first financial transaction based on the amount; extracting, after matching, the list of purchased items from the website of the merchant; identifying, after extracting the list of purchased items, a new budget category based on a purchased item of the list of purchased items; and reallocating, after identifying the new budget category and using the FMA, at least a portion of the amount corresponding to the purchased item to the new budget category.

In general, in one aspect, the invention relates to a system for tracking financial transactions. The system includes a processor; a memory associated with the processor; a repository having functionality to store a group of financial transactions; an acquisition module of a financial management application (FMA) stored in the memory, executing on the processor, and having functionality to: obtain the group of financial transactions, identify a first financial transaction of the group of financial transactions involving a payment from a financial account held by a financial institution, wherein the first financial transaction includes a name of a merchant, access a website of the merchant using credentials supplied by a user of the FMA, match, on the website of the merchant, a list of purchased items to the first financial transaction based on an amount of the first financial transaction corresponding to the payment, and extract, after matching, the list of purchased items from the website of the merchant; and an integration module of the FMA stored in the memory, executing on the processor, and having functionality to: allocate the amount to a budget category, identify, after extracting the list of purchased items, a new budget category based on a purchased item of the list of purchased items, and reallocate, after identifying the new budget category, at least a portion of the amount corresponding to the purchased item to the new budget category.

In general, in one aspect, the invention relates to a computer-readable storage medium storing a set of instructions for tracking financial transactions. The set of instructions include functionality to: obtain a group of financial transactions; identify a first financial transaction of the group of financial transactions involving a payment from a financial account held by a financial institution; allocate, to a budget category, an amount of the first financial transaction corresponding to the payment, wherein the first financial transaction includes a name of a merchant; access a website of the merchant using credentials supplied by a user of a financial management application (FMA); match, on the website of the merchant, a list of purchased items to the first financial transaction based on the amount; extract, after matching, the list of purchased items from the website of the merchant; identify, after extracting the list of purchased items, a new budget category based on a purchased item of the list of purchased items; and reallocate, after identifying the new budget category, at least a portion of the amount corresponding to the purchased item to the new budget category.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for obtaining detailed information about financial transactions. In general, embodiments of the invention obtain account data from an institution holding an account and then match the account data with matching data obtained from a merchant. The matching data may then be linked with the account data and/or used to categorize one or more transactions within the account data.

For purposes of this disclosure, account data may refer to any data corresponding to an account. The account may be an account of an individual, corporation, agency, and/or other entity. In one or more embodiments of the invention, account data is obtained from one or more financial institutions involved in the processing of a financial transaction. Account data may include one or more financial transactions, one or more amounts, transaction dates, transaction times, routing information, personal information about the owner of a financial card, and/or other transaction related information obtained from an institution holding the account (e.g., a financial institution). For example, when a payer completes an online purchase using a credit card, the issuing financial institution of the credit card may transmit account data corresponding to the purchase (e.g., a transaction amount, a processing date/time, a financial account number, etc.) to a financial management application. For purposes of this disclosure, a purchase may refer to any debit or credit applied to an account and may involve a product, service, gift, charitable contribution, refund, and/or any transfer of funds into or out of an account. Account data may also include any data directly or indirectly associated with one or more financial amounts. Other examples of account data include but are not limited to financial transactions, financial accounts, tax information (i.e., filing, forms, returns, etc), asset information (including depreciation/valuation), liability information (home mortgage(s), automobile loan(s), credit card(s), etc), and/or any associated metadata (including metadata associated with an account owner or other entity/person to whom the financial data may relate).

For purposes of this disclosure, matching data may refer to any data obtained from a merchant, payer, payee and/or third party entity. In one or more embodiments of the invention, matching data may be more detailed/granular data corresponding to one or more account data items and/or may include one or more account data items. Matching data may include metadata corresponding to one or more account data items. Examples of matching data may include a product description, product image, product price, transaction date, transaction amount, purchase order number, digital receipt, a confirmation number, a purchase order number, merchant coupons, individual account information, and/or a list of products purchased in a transaction. Matching data may also include any number of different file types (i.e., HTML, PDF, MS Word, CSV, XLS) including audio (MP3, WAV, etc), image (i.e., JPG, BMP, PNG, TIF, etc), and video file types (AVI, MPEG, etc). In one example, a merchant of an online purchase may display matching data corresponding to the purchase in a user's account history section of the merchant's website.

Figure 1:
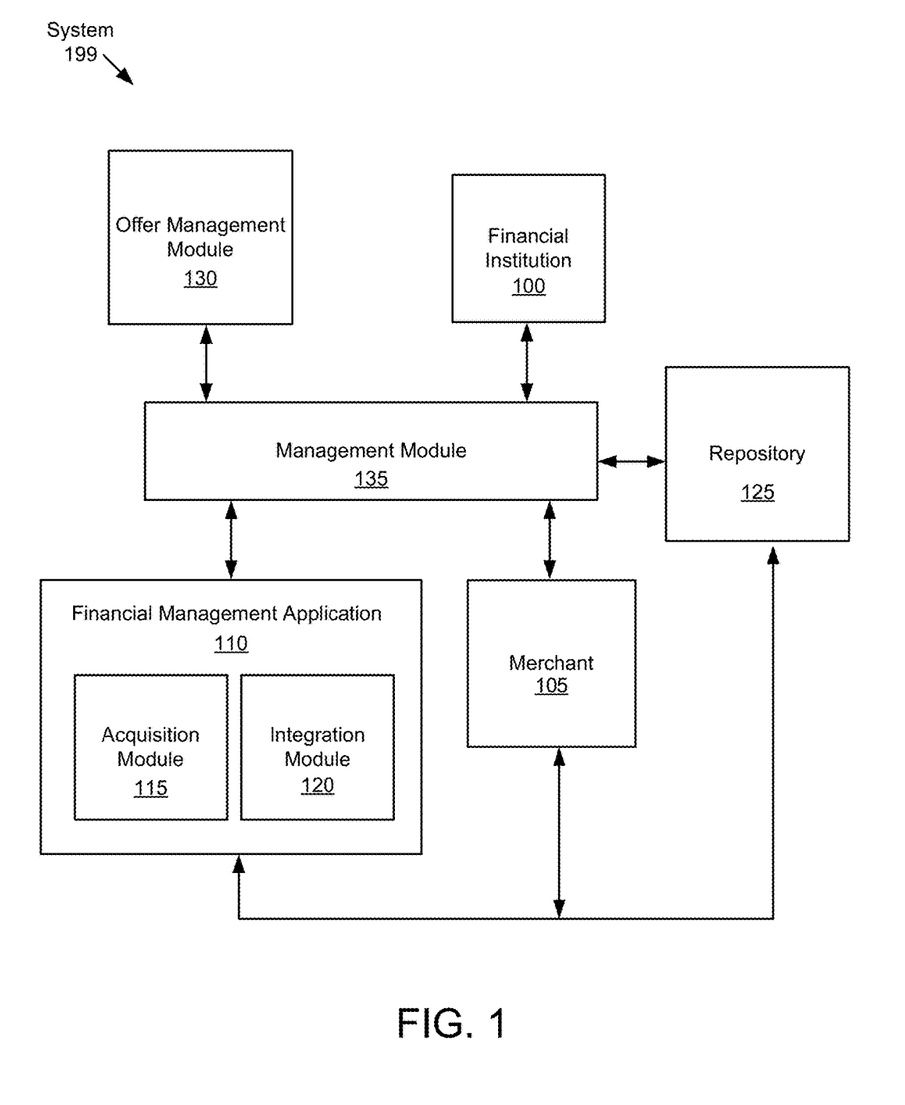
FIG. 1 depicts a schematic block diagram of a system in accordance with one or more embodiments of the invention.

FIG. 1 shows a system (199) in accordance with one embodiment of the invention. As shown in FIG. 1, the system has multiple components including a management module (135), an offer management module (130), a repository (125), a financial management application (110), an acquisition module (115), and an integration module (120). The system may communicate or be integrated with a financial institution (100) and/or a merchant (105). The components of the system may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the financial institution (100) is an entity storing account data. Examples of a financial institution (100) include but are not limited to a bank, a brokerage, a mortgage company, an issuer of a financial card, a payment intermediary service, a corporation, and/or any entity involved in financial activity and capable of sending, receiving, and/or storing an amount. The financial institution (100) may also include employees of and authorized third parties associated with the financial institution (100). The financial institution (100) may include one or more software applications operatively connected to a network (e.g., the Internet) and configured to send, receive, and/or modify account data in response to one or more requests. Examples of such an application include but are not limited to a financial management application, a financial web application, and/or any type of application capable of receiving and/or sending one or more amounts (e.g., a financial amount) to another entity (e.g., an end user).

In one or more embodiments of the invention, the merchant (105) is an entity capable of storing matching data. Examples of a merchant may include but are not limited to a vendor, seller, broker, individual proprietorship, corporation, government agency, and/or any entity capable of sending, receiving, and/or storing an amount. The merchant (105) may also include employees of and authorized third parties associated with the merchant (105). A merchant (105) may also be an entity which stores data corresponding to one or more account data items, including but not limited to a bank, financial institution, and/or payment intermediary. In one or more embodiments of the invention, the merchant (105) includes a software application owned by or integrated within the financial institution (100). Thus, both the merchant (105) and the financial institution (100) may include child software applications within a single corporation, agency, and/or parent software application. The merchant (105) may include one or more software applications operatively connected to a network and configured to send, receive, and/or modify matching data in response to one or more requests. Examples of such an application include but are not limited to a financial management application, a financial web application, and/or any type of application capable of storing, receiving, and/or transmitting one or more amounts (e.g., a financial amount) to another entity.

In one or more embodiments of the invention, the financial management application (110) is configured to store, categorize, report, import, track, and/or otherwise manage account data and matching data. The financial management application (110) may be a personal and/or business application. Examples of a financial management application (110) include tax preparation software, asset planning software, enterprise reporting software, an enterprise financial system, an online banking web application, a payroll system, a human resource management system, a personal finance software, and/or any application dealing with one or more amounts. In one example, an online personal finance application may allow users to track their spending/account balances and budget their expenditures. In one or more embodiments of the invention, the financial management application (110) is a client software application installed on one or more desktop or laptop computers. Alternatively, the financial management application (110) may be a web application installed on one or more servers and/or may include any number of client and/or server components. The financial management application (110) may also be integrated with other applications including but not limited to an inventory system, a payroll system, a human resource management system, a reporting system, an operations management system, a procurement system, and/or a customer relationship management system.

In one or more embodiments of the invention, the financial management application (110) includes two modules. Specifically, the financial management application (110) includes an acquisition module (115) and an integration module (120), both of which are described below.

In one or more embodiments of the invention, the acquisition module (115) is configured to obtain account data from the financial institution (100). The acquisition module (115) may be operatively connected to an application of the financial institution (100) and/or configured to "scrape" the required information from a website of the financial institution. For purposes of this disclosure, "web scraping" or "scraping" refers to extracting information from one or more websites using Hypertext Transfer Protocol (HTTP), via integration with a web browser, and/or any other method of obtaining information from a website known in the art. In one or more embodiments of the invention, a user of the financial management application (110) may provide login credentials (including authentication data such as one or more usernames and/or passwords) to the acquisition module (115), which are then used to scrape or extract content from the website. The user may be an owner of a financial account held by the financial institution (100) or an entity authorized for access to the financial account by the owner.

In one or more embodiments of the invention, the acquisition module (115) is configured to scrape matching data related to one or more financial transactions from a website of a merchant (105). The merchant (105) may be the payer or payee of the transaction. In one or more embodiments of the invention, the acquisition module (115) is communicatively connected to an ecommerce software application of the merchant and is able to send a request to identify an online purchase and receive a confirmation that the online purchase was identified by the ecommerce software application. In one or more embodiments of the invention, the acquisition module (115) and/or integration module (120) are separate components outside of the financial management application (110), although the components could also reside within the financial management application (110).

In one or more embodiments of the invention, the integration module (120) matches account data with matching data. In one or more embodiments of the invention, by matching transactions based on one or more criteria, the integration module (120) links matching data with one or more corresponding financial transactions imported from a financial institution (100). In one or more embodiments of the invention, the account data includes information relevant to the financial transaction as a whole while the matching data includes more detailed information such as individual product descriptions, merchant specific data, and/or line item financial amounts. The criterion for matching account data with matching data may be a list of common fields. If a predetermined number of these fields are found to exist and have common values among the two data sets (account data and matching data), a match is made.

In one or more embodiments of the invention, the repository (125) stores account data and matching data including financial transactions and transaction related files and/or data. The repository (125) is thus operatively connected to the financial management application (110) either directly or by means of the management module (135). In one or more embodiments of the invention, the acquisition module (115) obtains data from one or more financial institutions (e.g., financial institution (100)) and websites and then stores said information in the repository (125) for later usage by the integration module (120). The repository (125) may reside on any form of persistent storage device(s) including one or more hard disk drives, tape drives, flash memory drives, and/or RAID devices. The repository (125) may also be stored over a network of such devices, both inside and outside the firewall. Those skilled in the art will appreciate that other forms of storage technology may be used.

In one or more embodiments of the invention, the offer management module (130) matches financial transaction-related data (i.e., account data, matching data, budget categories, etc) with advertisements from one or more merchants. In one or more embodiments of the invention, a user of the financial management application (110) may be presented with an advertisement based upon transaction-related data associated with their purchase history. The advertisement may be selected by semantically matching the user's transaction-related data with one or more keywords and/or categories provided by the advertising merchant. For example, a user who has a history of purchasing audio equipment may be presented with an offer to purchase MP3 music files. In one or more embodiments of the invention, the offer management module (130) performs the matching and forwards the matched user and advertisement to the financial management application (110) which then presents the advertisement to the user. In one or more embodiments of the invention, offers may be matched and forwarded to a user of an external software application (i.e., a web server of a third party) based upon the financial transaction-related data of the user.

In one or more embodiments of the invention, the management module (135) provides interoperability, format conversion and/or cross-compatibility among the various components of the system (199), as illustrated in an exemplary form in FIG. 1. For example, the management module (135) may transfer data between the financial management application (110) and the financial institution (100), or vice-versa. Furthermore, the management module (135) may be used as a seamless integration point between any combination of components both within the system (199) and outside of the system.

In one or more embodiments of the invention, one or more of the components of the system (199) may be operatively connected to and/or configured to communicate directly with one or more other components of the system (199) without the usage of the management module (135). For example, the acquisition module may be configured to communicate directly with the merchant (105) and financial institution (100), and vice versa. One skilled in the art will appreciate that the management module (135), like all other components of the system (199), is optional and not required for the uninhibited operation of any other modules of the system (199).

Figure 2A:
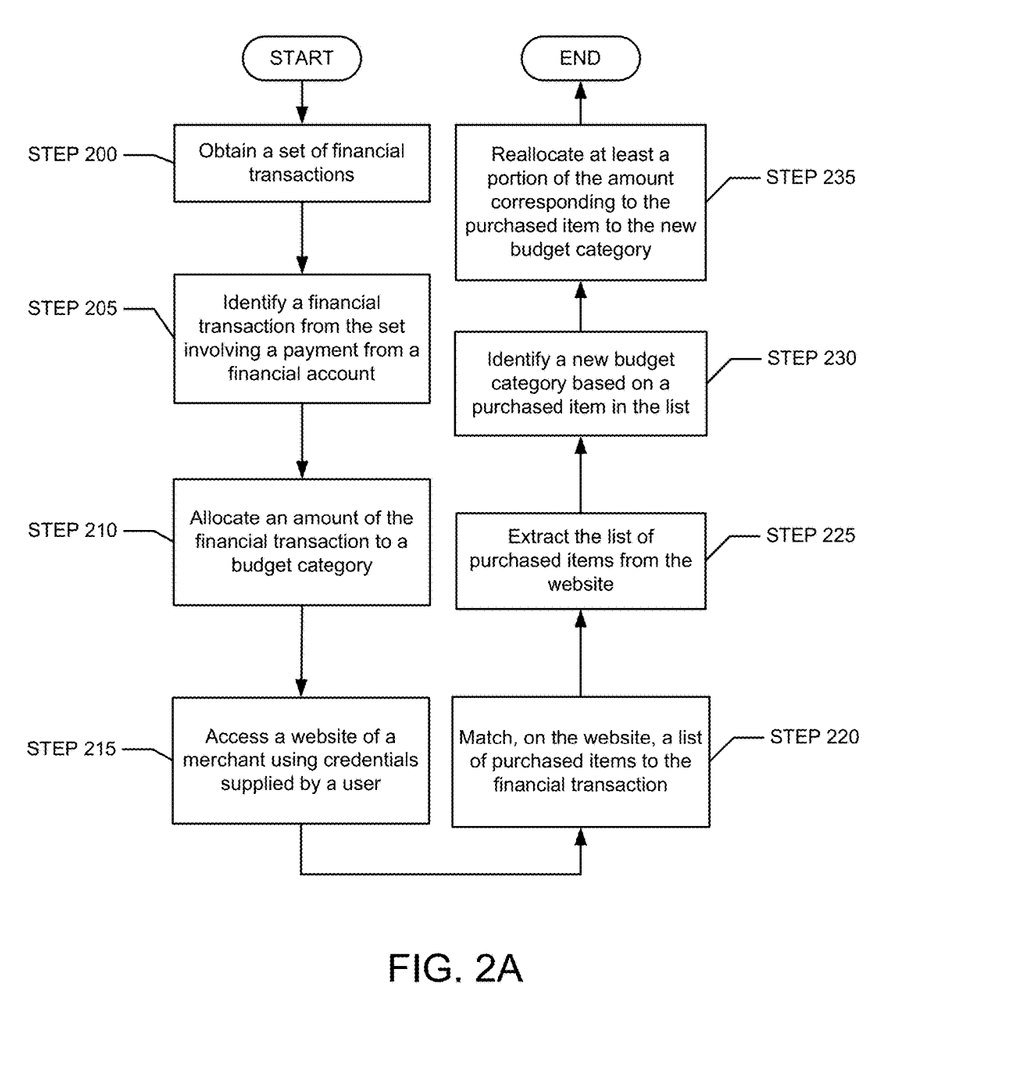
FIGS. 2A and 2B depict flowcharts in accordance with one or more embodiments of the invention.

FIG. 2A shows a flowchart in accordance with one or more embodiments of the invention. The steps of the flowchart shown in FIG. 2A may be used to match account data items from an account holder (e.g., a financial institution) to matching data items from a website of a merchant. The matching data is then linked with the financial transaction and used to categorize one or more amounts. Those skilled in the art, having the benefit of this detailed description, will appreciate the order and number of steps shown in FIG. 2A may differ among embodiments of the invention. Further, one or more steps in FIG. 2A may be optional.

In STEP 200, a set of financial transactions is obtained. These may be obtained from a financial institution and may correspond to a financial account held by the financial institution. The set of financial transactions may be obtained by a financial management application (FMA) (e.g., financial management application (110) of FIG. 1) in response to a user request or based on a periodic schedule of importing such transactions into the FMA. In one or more embodiments of the invention, the financial transactions are obtained from an issuing financial institution of a financial card used in one or more of the financial transactions in the set. A financial transaction may include a debit, a credit, a transaction date, a transaction time, an account number, a merchant name, a merchant address, a merchant account number, payee information, payer information, metadata detailing the path and method/format of transfer (e.g., OFX information), and/or any information directly or indirectly relevant to the debit or credit of funds from the financial account. In one example, a user interface of an FMA is presented to a user of the FMA. The user interface notifies the user that information corresponding to the financial account (within the FMA) is out-dated and that an import needs to be performed. The user then provides the FMA with a username and password to an online banking website. The FMA uses these credentials to initiate a session with the online banking website and import the set of financial transactions.

In STEP 205, a financial transaction involving a payment from a financial account is identified in the set of financial transactions. The financial transaction may include a debit or credit of the financial account associated with a payment method such as credit card, debit card, charge card, store card, gift card, check, electronic funds transfer (EFT), and/or any means of payment from a financial account as commonly known in the art. In one or more embodiments of the invention, the financial transaction is encoded in a message sent from a software application executing on a server of the financial institution. The message may be based upon an electronic standard for submitting financial information, such as OFX. In one or more embodiments of the invention, the financial transaction is obtained by a financial management application (e.g., financial management application (110) of FIG. 1, discussed above). The financial transaction may correspond to an online purchase of one or more products and may lack product-specific information regarding the purchase.

In STEP 210, an amount of the financial transaction is allocated to a budget category. The budget category may be pre-defined or customized by a financial management application (e.g., financial management application (110) of FIG. 1, discussed above), a user of the financial management application, a financial institution, a merchant, and/or any authorized entity. In one or more embodiments of the invention, the budget category defines the type of products and/or services that were purchased. The budget category may also define the business category or industry of the merchant. In one example, a financial transaction corresponding to a purchase from a consumer electronics retailer is placed in an "electronics" budget category. In another example, a financial transaction corresponding to a purchase of automotive goods (e.g., floor mats, tires, etc), is placed in an "automotive" budget category. In one or more embodiments of the invention, the budget category is used by a financial management application (e.g., financial management application (110) of FIG. 1, discussed above) to generate periodic spending reports and/or to allocate personal or business related expenses for accounting purposes, such as budgeting, forecasting, reporting, etc. The budget category may also correspond to an account within the FMA designated for deductions on a tax form of a financial return. In one or more embodiments of the invention, a user interface may be used to prompt the holder of the account for entry of the budget category. Alternatively, any user of the FMA with the appropriate pre-defined credentials may enter the budget category.

In STEP 215, a website of a merchant is accessed using credentials supplied by a user. The user may be the owner of the account or anyone authorized by the owner of the account to access the account. Credentials may include but are not limited to a username, password, social security number, PIN number, financial card number/information, account number, a text string obtained by the user from a software application of the financial account (i.e., a token), a biometric authorization, the user's name, address, social security number, date of birth, specific details of the financial transaction (e.g., transaction date, transaction amount, financial account number, information about the financial card used in the financial transaction, etc.) and/or any other method of user identification and/or authentication. In one or more embodiments of the invention, the user is prompted for credentials by a graphical user interface (e.g., to acquisition module (115) of FIG. 1, discussed above). The credentials may be used to access the merchant's website and/or to identify the online purchase.

Figure 2B:
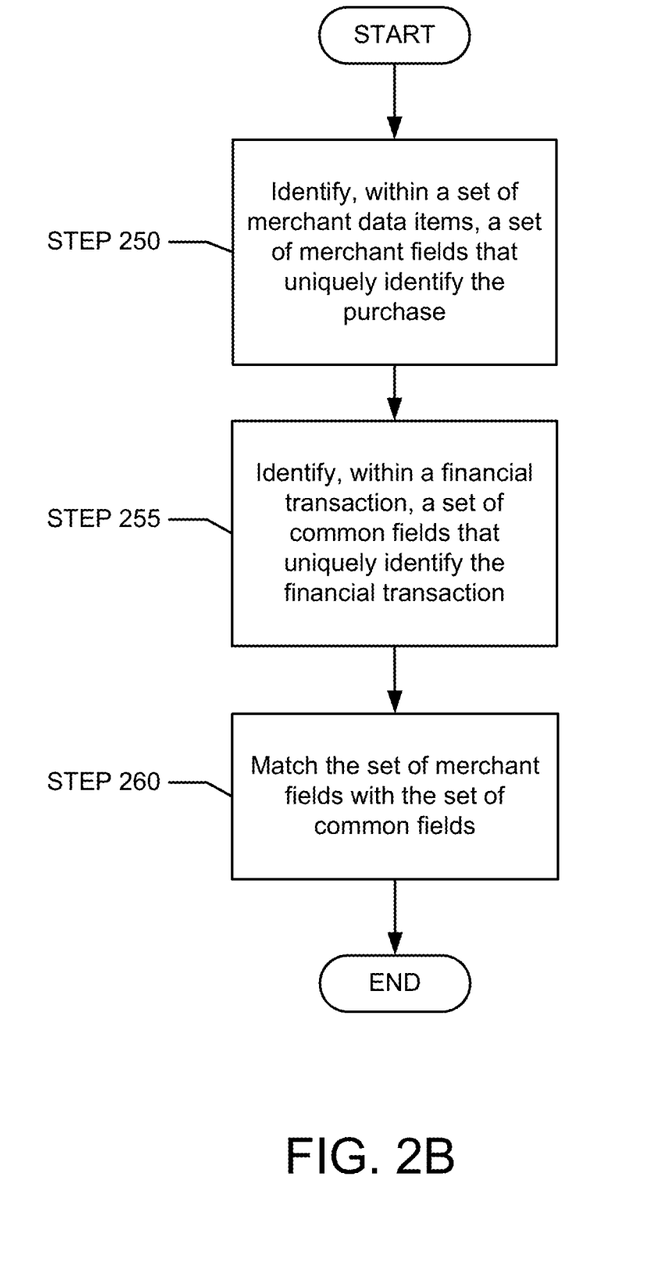

In STEP 220, the financial transaction is matched to a list of purchased items on the website of the merchant (e.g., merchant (105) of FIG. 1, discussed above). In accordance with one or more embodiments of the invention, FIG. 2B shows a flowchart which describes a process for matching account data items to matching data items (e.g., from a merchant website) in further detail.

In STEP 225, the list of purchased items (i.e., matching data) is extracted from the website. In one or more embodiments of the invention STEP 220 and STEP 225 are performed by scraping the merchant's website using one or more matching criteria to identify and extract information related to the financial transaction. In one or more embodiments of the invention, in addition to the list of items purchased in the online transaction, other matching data items including one or more images, audio/video clips, testimonials, and/or user reviews of one or more of the purchased items may be matched and extracted from the website. In one or more embodiments of the invention, the matching data items are downloaded into a FMA and/or into a file on a computer designated by a user of the FMA or other entity. In one or more embodiments of the invention, an FMA may be configured to scrape and extract any number of matching data items from any number of merchants and/or external sources automatically. The FMA may then match these matching data items to any number of financial transactions within the FMA. In one or more embodiments of the invention, STEP 225 may occur before STEP 220 such that, initially (prior to matching), a set of matching data items corresponding to a set of purchases is extracted from the merchant's website. In this case, all matching data items corresponding to the user or an account of the user on the website may be extracted. After extracting the set of matching data items, one or more purchases among the set of matching data items are matched to financial transactions in the same manner described.

After extraction, the matching data items may be linked with the financial transaction. In one or more embodiments of the invention, a financial management application links the matching data items with the financial transaction by creating a reference to the financial transaction in a repository (e.g., repository (125) of FIG. 1, discussed above). In one or more embodiments of the invention, the repository is a relational database and linking the matching data with the financial transaction involves entering the matching data into one or more tables of the database and entering one or more values referencing the matching data into a table containing the financial transaction. In one or more embodiments of the invention, the matching data items and the financial transaction are relationally displayed on a user interface of a software application (e.g., see transaction 505 and matching data items 510 of FIG. 5, discussed below). Thus, the financial transaction may be displayed with a graphical user interface (GUI) element that visually references the matching data items as they are displayed concurrently with the financial transaction.

In STEP 230, a new budget category is identified based on a purchased item in the list of purchased items. The new budget category may be based on a textual or semantic match of the list of purchased items with a name of the new budget category. In one or more embodiments of the invention, a FMA (or other application) may use a graphical user interface to display the list of purchased items and prompt a user of the FMA to enter one or more categories. Thus, the new budget category may be defined by the user and/or preconfigured by the FMA. The user may also be allowed to allocate at least a portion of the amount (or the entire amount) to the one or more categories. In one or more embodiments of the invention, the new budget category may be a part of a set of matching data items extracted from the merchant's website. In this way, the new budget category, and other imported categories, may be assigned by the merchant.

In STEP 235 at least a portion of the amount corresponding to the purchased item is reallocated to the new budget category. In this way, one or more amounts corresponding to one or more products in the list of purchased products may be reallocated to the new budget category. The total amount is a summation of these separate item-level amounts (and other transaction charges, if applicable). In one or more embodiments of the invention, the reallocation is performed based on a match between a pre-defined list of budget categories and a description of a product. For example, a product is identified as a portable CD player and a textual search of the product name and description identifies various descriptive terms corresponding to the product. Based on these descriptive terms, a list of pre-defined budget categories is searched and semantically matched by a software application (e.g., integration module (120) of FIG. 1, discussed above). In one or more embodiments of the invention, a product category is identified for the product. In one example, a purchase of a science fiction book is assigned to the "books—fiction" product category. In one or more embodiments of the invention, one or more amounts from one or more other financial transactions which correspond to purchases of products in the same product category may be reallocated to the new budget category as well. In one example, a user of an FMA may be prompted by a user interface for permission to "learn" the association between this product category and the new budget category for automatic categorization of future financial transactions.

FIG. 2B shows a flowchart in accordance with one or more embodiments of the invention. The steps of the flowchart shown in FIG. 2B may be used to match account data items from an account holder (e.g., a financial institution) to matching data items from a website of a merchant. Those skilled in the art, having the benefit of this detailed description, will appreciate the order and number of steps shown in FIG. 2B may differ among embodiments of the invention. Further, one or more steps in FIG. 2B may be optional.

In STEP 250, one or more merchant fields that uniquely identify the purchase are identified within the matching data items. Merchant fields may include purchase related fields such as purchase date, purchase amount, payment type, credit card authorization number, purchase order number, check number, financial account number, and/or any field directly or indirectly corresponding to the purchase. As an example, purchase amount, purchase date, and credit card number may be used to uniquely identify purchases on a given merchant's website.

In STEP 255, one or more common fields that uniquely identify the financial transaction are identified within the account data items. Common fields may include transaction related fields such as transaction date, transaction amount, payment type, credit card authorization number, transaction number, check number, financial account number, and/or any field directly or indirectly corresponding to the purchase. As an example, transaction amount, transaction date, and financial account number may be used to uniquely identify purchases on a given merchant's website.

In STEP 260, the set of merchant fields is matched with the set of common fields. In one or more embodiments of the invention, fields within each set of data (account data and matching data) are matched based upon a string comparison of field names. Fields with substantially similar names (e.g., 90% character match) may be identified as matching fields. In one or more embodiments of the invention, the content of the fields are compared and fields with similar or identical content and/or formatting are identified as matching fields. In another embodiment of the invention, an FMA may be displayed a user interface to a user of the FMA with the two data sets and/or with potential matches. The user is then able to modify and/or remove matches between fields and to identify one or more subsets of the fields that uniquely identify a financial transaction or purchase. In one or more embodiments of the invention, a set of relationships between account data items and matching data items is received from the user of an FMA and stored into a repository. Subsequently, within the repository, a relationship is identified between each merchant field in the set of merchant fields and at least one common field in the set of common fields. If the relationships between the two sets (merchant fields and common fields) are not identified, one or more fields in at least one of the sets must be modified until the relationships are identified. Each set must continue to uniquely identify purchases and/or transactions in order to maintain the integrity of the matching criteria.

Figure 3:
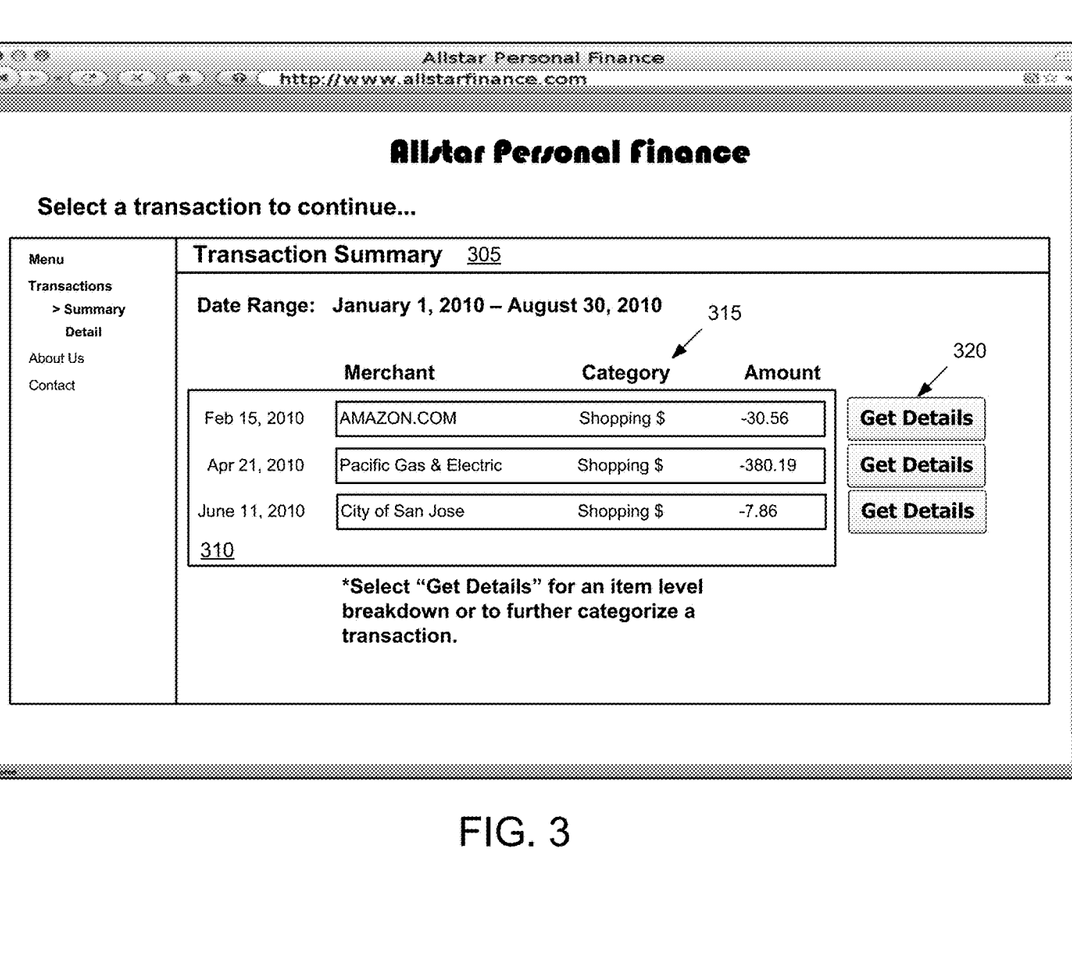
FIGS. 3-5 depict example screen shots in accordance with one or more embodiments of the invention.
Figure 4:
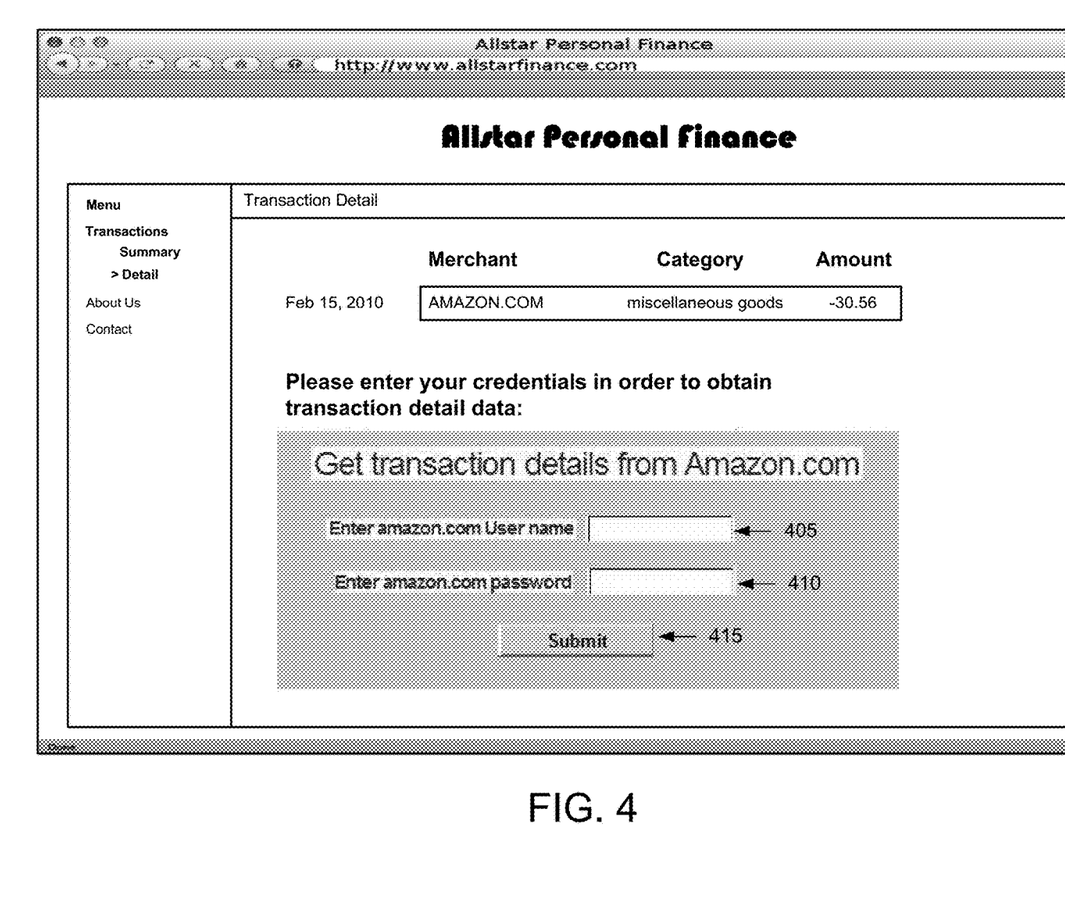
Figure 5:
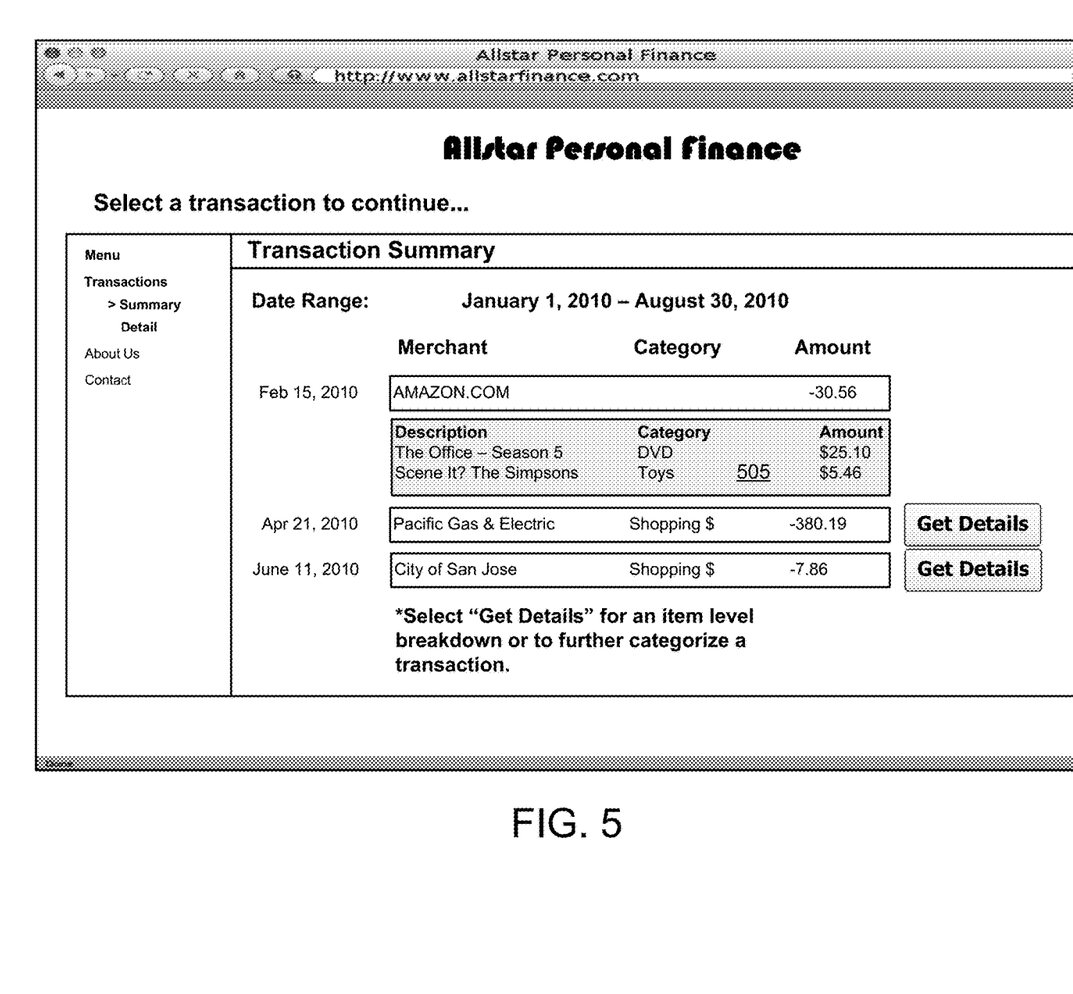

FIGS. 3-5 depict an example screen shot in accordance with one or more embodiments of the invention. In the example, a user of a FMA purchases a number of items from an online retailer (amazon.com) with a credit card issued by Acme National Bank. The total of the online purchase is $30.56. The user intends to track her personal budget with the FMA to reflect the online purchase. The FMA imports the financial transaction from Acme National Bank and automatically allocates the entire transaction amount to "miscellaneous goods." Subsequently, the user logs in and notices that she has a new amount budgeted to miscellaneous goods and that there is an action item displayed on her budget to reallocate the amounts in this budget category.

As depicted in the example screen shot of FIG. 3, she navigates to a transaction summary page of the FMA that displays a group of recent transactions (310) and their corresponding budget category (315). Here, she selects the "Get Details" button (320) for a transaction corresponding to the online purchase she made at amazon.com. Upon making the selection, the user is redirected to a transaction detail page shown in FIG. 4.

Turning to FIG. 4, she is prompted for a username (405) and password (410) to the amazon.com website in order to retrieve more detailed data and information for the selected financial transaction. Upon entering her credentials and selecting the "Submit" button (415), the system scrapes her amazon.com transaction history from the amazon.com website and extracts/downloads data relevant to the financial transaction (i.e., matching data). In order to do the scraping, the matching techniques discussed in STEP 220 of FIG. 2A and STEPS 250-260 of FIG. 2B may be used to match the list of purchased items to the financial transaction.

Upon returning to the transaction summary page shown in FIG. 5, she now sees product level details for the transaction, as well as a more granular category assignment. Amounts corresponding to the two purchased items are each categorized to different budget categories (DVD and Toys). This reallocation of at least a potion of the amount corresponding to the purchased items to a new budget category may use the techniques discuss in STEP 235 of FIG. 2A. Also, a description of the products (505) is displayed with the item-level amounts beneath the transaction, as shown in FIG. 5.

In another example, a homeowner pays her monthly utility bill with a debit card on a website of her utility provider. Some time later, she logs in to a financial management application (FMA) and decides to view her payment history for the utility company. She finds all of the individual financial transactions corresponding to her payments for the past year. She notices that the monthly bill has increased by about 50% in the past two months, so she decides to investigate further. Within the FMA, the homeowner selects all of the aforementioned transactions and chooses an option to extract billing information. The FMA, having stored her login credentials to the website of the utility company, scrapes relevant information from the website and links the information to the selected financial transactions. The homeowner then selects two financial transactions corresponding to two different utility payments for comparison. Upon selection, utility cost and energy usage details extracted from the utility company website are displayed. She notices that although her electricity usage has been rather constant, her natural gas usage has tripled. She reasons that the increase is probably due to her usage of a gas furnace for heating the home during an unusually cold winter. The detailed information extracted from the website includes a promotional offer to purchase an electric smart meter to more accurately track and control her electricity usage. Various notifications about upcoming price changes as well as a projection of her bill for the next six months (based on recent consumption patterns) are also presented.

In another example, an account owner writes a check to his gardener for two services rendered. The first service is a gutter repair which costs him $200 and the second is for monthly general landscaping (lawn and garden care) which costs him $100. Thus, the account owner writes a single check to his gardener in the amount of $300 and makes sure to write the following on the face of the check (in the "for" field): "1) lawn care $100 2) gutter repair $200." Weeks later, having forgotten the services rendered, the account owner sees the $300 check in an online session of a financial management application (FMA).

In this example, the FMA is configured to periodically import transactions from his bank and to prompt him for budget allocation of the imported amounts. He sees that the entire amount was allocated to a "lawn care" category which he created to track his monthly general landscaping expenses. However, he also notices that he has exceeded his allotted budget for this category by $200 for the given month. Within the FMA, he clicks on a button associated with the $300 financial transaction labeled "get details." Since he has performed this action before (for other financial transactions in the same account), the FMA has saved the login credentials for his online banking account. The FMA uses these credentials to establish an online session with a web server of the financial institution holding his account. During the online session the FMA identifies an image of the $300 check on the web server and extracts the image. The image is then imported into the FMA and analyzed for additional information. First, the FMA performs an optical character recognition (OCR) scan on the image. Then, the identified text is analyzed and the list of services rendered is extracted from the check. Finally, based on the specified amounts (in the "for" field of the check), the $200 which was originally allocated to the "lawn care" budget category is reallocated to "miscellaneous expenses." The list of services rendered and the image of the check are displayed for the account owner concurrently with the financial transaction and, accordingly, the account owner understands why his budget was exceeded.

Figure 6:
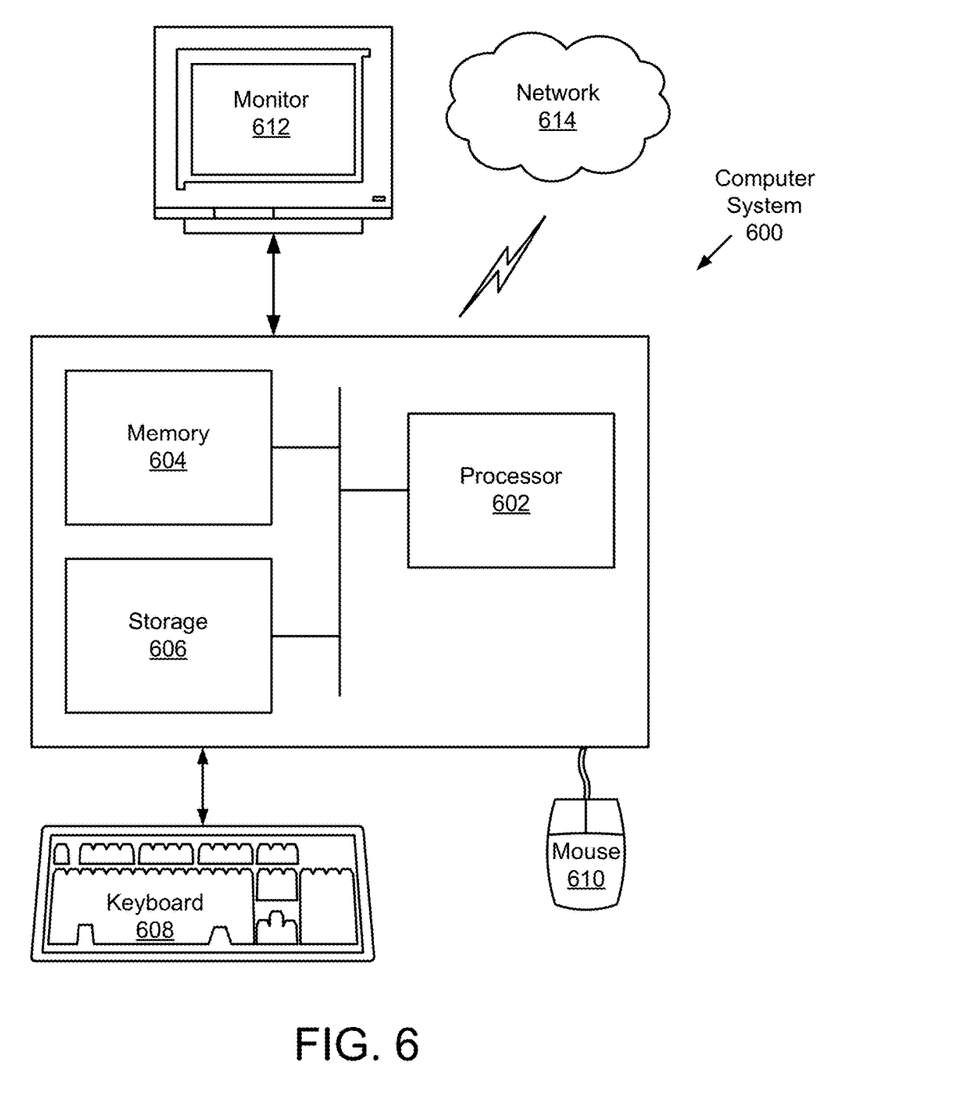
FIG. 6 depicts a computer system in accordance with one or more embodiments of the invention.

Embodiments of the invention may be implemented on virtually any type of computer regardless of the platform being used. For example, as shown in FIG. 6, a computer system (600) includes one or more processor(s) (602) (such as a central processing unit (CPU), integrated circuit, or other hardware processor), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer system (600) may also include input means, such as a keyboard (608), a mouse (610), or a microphone (not shown). Further, the computer system (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, in one or more embodiments of the invention, one or more elements of the aforementioned computer system (600) may be located at a remote location and connected to the other elements over a network. Further, embodiments of the invention may be implemented on a distributed system having a plurality of nodes, where each portion of the invention (e.g., offer management module (130), acquisition module (115), integration module (120), etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By viewing account data (e.g., from a financial institution) and matching data (e.g., from a merchant), users are able to see greater detail in account related transactions. Thus, users are able to see detailed information (i.e., matching data) relating to transactions concurrently with their account data.

One or more embodiments of the invention have one or more of the following advantages. Users are able to assign multiple amounts from a single financial transaction to different budget categories. Additionally, users are presented with one or more advertisements based on specific items or categories of items they have purchased.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for tracking a plurality of financial transactions, comprising:
    obtaining, using a financial management application (FMA) executing on a hardware processor, the plurality of financial transactions from a financial institution;
    identifying, using the FMA, a first financial transaction of the plurality of financial transactions, wherein the first financial transaction involves a payment from a financial account of a user of the FMA to a merchant, and wherein the first financial transaction corresponds to at least a first purchased item and a second purchased item;
    allocating, using the FMA, a financial amount corresponding to the payment to a budget category;
    accessing, by the FMA and after obtaining the plurality of financial transactions from the financial institution, a website of the merchant using a plurality of login credentials supplied by the user of the FMA, wherein the website of the merchant comprises a purchase history of the user;
    matching, using at least the financial amount as a search criterion, the first financial transaction to a list of purchased items in the purchase history of the user on the merchant website,
        wherein the list of purchased items comprises the first purchased item, and the second purchased item, a first price for the first purchased item, and a second price for the second purchased item, and
        wherein the financial amount is a sum of at least the first price and the second price;
    extracting, after matching, the list of purchased items from the website of the merchant;
    identifying, by a prompt from the FMA and after extracting the list of purchased items, a new budget category for the first purchased item, wherein the FMA learns the new budget category for future transactions; and
    reallocating, after identifying the new budget category and by the FMA, the first price to the new budget category, wherein the second price remains allocated to the budget category.

2. The method of claim 1, wherein matching the list of purchased items to the first financial transaction comprises:
    identifying, on the website of the merchant, a plurality of merchant fields that uniquely identify the purchase;
    identifying, within the first financial transaction, a plurality of common fields that uniquely identify the first financial transaction, wherein the plurality of common fields comprises the amount; and
    matching the plurality of merchant fields with the plurality of common fields.

3. The method of claim 2, wherein matching the plurality of merchant fields with the plurality of common fields further comprises:
    identifying, within a repository, a plurality of pre-defined relationships between the plurality of merchant fields and the plurality of common fields.

4. The method of claim 1, further comprising:
    identifying a plurality of financial amounts corresponding to a product category of the purchased item in the plurality of financial transactions; and
    reallocating the plurality of financial amounts to the new budget category.

5. The method of claim 1, further comprising:
    identifying a second financial transaction of the plurality of financial transactions comprising a new amount corresponding to a product category of the purchased item; and
    allocating the new amount to the new budget category.

6. The method of claim 1, further comprising:
    storing, in a repository, the plurality of financial transactions; and
    identifying, based on a plurality of products purchased in the plurality of financial transactions, a common product category.

7. The method of claim 6, further comprising:
    outputting, based on the common product category, an advertisement to the user from a business selling services associated with the common product category.

8. The method of claim 6, further comprising:
    outputting, based on the common product category, an advertisement to the user from a business selling products within the common product category.

9. The method of claim 1, further comprising:
    storing, by the FMA and after extracting the list of purchased items, the list of purchased items in a repository comprising the first financial transaction; and
    linking, within the repository, the list of purchased items to the first financial transaction.

10. The method of claim 1, wherein accessing the website of the merchant using a plurality of credentials supplied by a user of the FMA comprises:
    displaying the prompt to the user requesting a URL of the website and plurality of credentials;

receiving, by the FMA and in response to the prompt, the URL of the website and the plurality of credentials from the user; and initiating a session on the website by accessing the URL and providing the plurality of credentials to the website for authentication.

11. The method of claim 1, further comprising:

receiving, prior to accessing the website of the merchant, a request from the user to access the website of the merchant.

12. The method of claim 1, wherein identifying the new budget category comprises:

displaying, in a user interface of the FMA, the list of purchased items to the user;

prompting, by the user interface, the user to enter a category; and receiving, by the user interface and after prompting the user, the new budget category from the user.

13. The method of claim 1, wherein the list of purchased items comprises a description of the purchased item.

14. A system for tracking a plurality of financial transactions, comprising:

a processor;

a memory associated with the processor;

a repository comprising functionality to store the plurality of financial transactions from a financial institution;

an acquisition module of a financial management application (FMA) stored in the memory, executing on the processor, and comprising functionality to:

obtain the plurality of financial transactions, identify a first financial transaction of the plurality of financial transactions involving a payment from a financial account of a user of the FMA to a merchant, wherein the first financial transaction corresponds to at least a first purchased item and a second purchased item, access, after the plurality of financial transactions are obtained from the financial institution, a website of the merchant using a plurality of login credentials supplied by the user of the FMA, wherein the website of the merchant comprises a purchase history of the user, match, using at least the financial amount as a search criterion, the first financial transaction to a list of purchased items in the purchase history of the user on the merchant website, wherein the list of purchased items comprises the first purchased item, the second purchased item, a first price for the first purchased item, and a second price for the second purchased item, and wherein the financial amount is a sum of at least the first price and the second price, and extract, after matching, the list of purchased items from the website of the merchant; and an integration module of the FMA stored in the memory, executing on the processor, and comprising functionality to:

allocate a financial amount corresponding to the payment to a budget category, identify, by a prompt from the FMA and after extracting the list of purchased items, a new budget category for the first purchased item, wherein the FMA learns the new budget category for future transactions, and reallocate, after identifying the new budget category, the first price to the new budget category, wherein the second price remains allocated to the budget category.

15. The system of claim 14, wherein matching the list of purchased items to the first financial transaction comprises:

identifying, on the website of the merchant, a plurality of merchant fields that uniquely identify the purchase;

identifying, within the first financial transaction, a plurality of common fields that uniquely identify the first financial transaction, wherein the plurality of common fields comprises the amount; and matching the plurality of merchant fields with the plurality of common fields.

16. The system of claim 15, wherein matching the plurality of merchant fields with the plurality of common fields further comprises:

identifying, within the repository, a plurality of predefined relationships between the plurality of merchant fields and the plurality of common fields.

17. The system of claim 14, further comprising:

an offer management module stored in the memory, executing on the processor, and comprising functionality to:

identify, based on a plurality of products purchased in the plurality of financial transactions, a common product category.

18. The system of claim 17, wherein the offer management module further comprises functionality to:

output, based on the common product category, an advertisement to an owner of the financial account from a business selling services associated with the common product category.

19. The system of claim 17, wherein the offer management module further comprises functionality to:

output, based on the common product category, an advertisement to an owner of the financial account from a business selling products within the common product category.

20. The system of claim 14, wherein the integration module further comprises functionality to:

identify a second financial transaction of the plurality of financial transactions comprising a new amount corresponding to a product category of the purchased item; and allocate the new amount to the new budget category.

21. The system of claim 14, wherein the acquisition module further comprises functionality to:

store, after extracting the list of purchased items, the list of purchased items in the repository; and link, within the repository, the list of purchased items to the first financial transaction.

22. The system of claim 14, wherein accessing the website of the merchant using a plurality of credentials supplied by a user of the FMA comprises:

displaying the prompt to the user requesting a URL of the website and plurality of credentials;

receiving, in response to the prompt, the URL of the website and the plurality of credentials from the user; and initiating a session on the website by accessing the URL and providing the plurality of credentials to the website for authentication.

23. The system of claim 14, wherein identifying the new budget category comprises:

displaying, in a user interface of the FMA, the list of purchased items to the user;

prompting, by the user interface, the user to enter a category; and receiving, by the user interface and after prompting the user, the new budget category from the user.

24. A non-transitory computer-readable storage medium storing a plurality of instructions for tracking a plurality of financial transactions, the plurality of instructions comprising functionality to:
 obtain, using a financial management application (FMA) executing on a hardware processor, the plurality of financial transactions from a financial institution;
 identify, using the FMA, a first financial transaction of the plurality of financial transactions involving a payment from a financial account of a user of the FMA to a merchant, wherein the first financial transaction corresponds to at least a first purchased item and a second purchased item;
 allocate, using the FMA, a financial amount corresponding to the payment to a budget category;
 access, by the FMA and after the plurality of financial transactions are obtained, a website of the merchant using a plurality of login credentials supplied by a user of the FMA, wherein the website of the merchant comprises a purchase history of the user;
 match, using at least the financial amount as a search criterion, the first financial transaction to a list of purchased items in the purchase history of the user on the merchant website,
  wherein the list of purchased items comprises the first purchased item, the second purchased item, a first price for the first purchased item, and a second price for the second purchased item, and
  wherein the financial amount is a sum of at least the first price and the second price;
 extract, after matching, the list of purchased items from the website of the merchant;
 identify, by a prompt from the FMA and after extracting the list of purchased items, a new budget category for the first purchased item, wherein the FMA learns the new budget category for future transactions; and
 reallocate, after identifying the new budget category and by the FMA, the first price to the new budget category, wherein the second price remains allocated to the budget category.

25. The non-transitory computer-readable storage medium of claim 24, wherein matching the list of purchased items to the first financial transaction comprises:
 identifying, on the website of the merchant, a plurality of merchant fields that uniquely identify the purchase;
 identifying, within the first financial transaction, a plurality of common fields that uniquely identify the first financial transaction, wherein the plurality of common fields comprises the amount; and
 matching the plurality of merchant fields with the plurality of common fields.

26. The non-transitory computer-readable storage medium of claim 25, wherein matching the plurality of merchant fields with the plurality of common fields further comprises:
 storing, within a repository, a plurality of pre-defined relationships between the plurality of merchant fields and the plurality of common fields.

27. The non-transitory computer-readable storage medium of claim 24, wherein the plurality of instructions further comprise functionality to:
 identify, based on a plurality of products purchased in the plurality of financial transactions, a common product category.

28. The non-transitory computer-readable storage medium of claim 27, wherein the plurality of instructions further comprise functionality to:
 output, based on the common product category, an advertisement to the user from a business selling products within the common product category.

29. The non-transitory computer-readable storage medium of claim 27, wherein the plurality of instructions further comprise functionality to:
 output, based on the common product category, an advertisement to the user from a business selling services associated with the common product category.

30. The non-transitory computer-readable storage medium of claim 24, wherein the plurality of instructions further comprise functionality to:
 identify a plurality of financial amounts corresponding to a product category of the purchased item in the plurality of financial transactions; and
 reallocate the plurality of financial amounts to the new budget category.

31. The non-transitory computer-readable storage medium of claim 24, wherein the plurality of instructions further comprise functionality to:
 identify a second financial transaction of the plurality of financial transactions comprising a new amount corresponding to a product category of the purchased item; and
 allocate the new amount to the new budget category.

32. The non-transitory computer-readable storage medium of claim 24, wherein the plurality of instructions further comprise functionality to:
 store, after extracting the list of purchased items, the list of purchased items in a repository; and
 link, within the repository, the list of purchased items to the first financial transaction.

33. The non-transitory computer-readable storage medium of claim 24, wherein accessing the website of the merchant using a plurality of credentials supplied by a user of the FMA comprises:
 displaying the prompt to the user requesting a URL of the website and plurality of credentials;
 receiving, in response to the prompt, the URL of the website and the plurality of credentials from the user; and
 initiating a session on the website by accessing the URL and providing the plurality of credentials to the website for authentication.

34. The non-transitory computer-readable storage medium of claim 24, wherein identifying the new budget category comprises:
 displaying, in a user interface of the FMA, the list of purchased items to the user;
 prompting, by the user interface, the user to enter a category; and
 receiving, by the user interface and after prompting the user, the new budget category from the user.

* * * * *